(12) United States Patent
Herd et al.

(10) Patent No.: US 12,703,632 B2
(45) Date of Patent: Aug. 11, 2026

(54) ELECTRICALLY CONDUCTIVE CARBON BLACK

(71) Applicant: Birla Carbon U.S.A Inc., Marietta, GA (US)

(72) Inventors: Charles R. Herd, Woodstock, GA (US); James Wilfred Kollar, Kennesaw, GA (US)

(73) Assignee: BIRLA CARBON U.S.A., INC., Marietta, GA (US)

( * ) Notice: Subject to any disclaimer, the term of this patent is extended or adjusted under 35 U.S.C. 154(b) by 996 days.

(21) Appl. No.: 17/739,569

(22) Filed: May 9, 2022

(65) Prior Publication Data

US 2022/0281748 A1 Sep. 8, 2022

Related U.S. Application Data

(60) Provisional application No. 63/158,206, filed on Mar. 8, 2021.

(51) Int. Cl.
*C01B 32/05* (2017.01)
*C08K 3/04* (2006.01)

(52) U.S. Cl.
CPC .......... *C01B 32/05* (2017.08); *C01P 2006/12* (2013.01); *C01P 2006/90* (2013.01); *C08K 3/04* (2013.01); *C08K 2201/006* (2013.01)

(58) Field of Classification Search
CPC .. C01B 32/05; C01P 2006/12; C01P 2006/90; C01P 2004/12; C01P 2004/64; C01P 2004/84; C01P 2006/19; C08K 3/04; C08K 2201/006; C09C 1/48
See application file for complete search history.

(56) References Cited

U.S. PATENT DOCUMENTS

2013/0037759 A1* 2/2013 Svanberg ................. H01B 1/24
977/734
2019/0211208 A1* 7/2019 Korchev ................... C09C 1/50
2020/0056050 A1* 2/2020 Atanassova ........... H01M 4/625
2020/0369851 A1* 11/2020 Herd ....................... C08L 23/16

OTHER PUBLICATIONS

Elftex 254 Data Sheet (Year: 2020).*
Improvement of electrical properties and thermal conductivity of ethylene propylene diene monomer (EPDM)/barium titanate (BaTiO3) by carbon blacks and carbon fibers (Year: 2016).*
Raven Blacks, published by Columbian Chemicals in Oct. 2006.†

* cited by examiner
† cited by third party

*Primary Examiner* — Coris Fung
(74) *Attorney, Agent, or Firm* — Ballard Spahr LLP

(57) ABSTRACT

A carbon black composition having a small primary particle size for use in elastomeric compositions, wherein the carbon black comprises aggregated particles configured to impart electrical conductivity to the elastomeric composition approaching that of extra-conductive carbon black, the disclosure relating to conductive carbon materials for elastomer applications and addressing the need for improved conductivity at reduced particle size.

11 Claims, 16 Drawing Sheets

FIG. 5

ELECTRICALLY CONDUCTIVE CARBON BLACK

CROSS-REFERENCE TO RELATED APPLICATIONS

This application claims priority to U.S. Provisional Application No. 63/158,206, filed Mar. 8, 2021, the entirety of which is incorporated into this application by reference.

TECHNICAL FIELD

This disclosure relates to carbon blacks that are useful for imparting electrical conductive in elastomeric compositions.

TECHNICAL BACKGROUND

Carbon blacks have long been used in elastomeric compositions for reinforcement purposes, but improvements are needed in the areas of conductive carbon black compositions. These needs and other needs are satisfied by the compositions and methods of the present disclosure.

SUMMARY

In accordance with the purpose(s) of the disclosure, as embodied and broadly described herein, this disclosure, in one aspect, relates to carbon black and methods for the manufacture and use thereof.

In one aspect, the inventive carbon black has the following properties: an oil absorption number (OAN) ranging from about 74 cc/100 g to about 114 cc/100 g; a nitrogen surface area (NSA) ranging from about 450 $m^2/g$ to about 650 $m^2/g$; a statistical thickness surface area (STSA) ranging from about 330 $m^2/g$ to about 385 $m^2/g$; a transmission value at 425 nm ranging from about 95% to about 100%; a heat loss ranging from 0 to about 12.5%; and a 325 mesh water wash residue ranging from 0 to about 40 ppm.

In a further aspect, the disclosure relates to an elastomeric composition comprising the inventive carbon black. In one aspect, the elastomeric composition comprises an elastomer in an amount of 100 parts per hundred rubber (phr); and the inventive carbon black of claim in an amount ranging from 2 parts per hundred rubber (phr) to 25 parts per hundred rubber (phr).

In a further aspect, the disclosure relates to an article comprising the inventive elastomeric composition.

Also disclosed is a method of making the elastomeric compositions. In one aspect, the method comprises providing an elastomer in an amount of about 100 parts per hundred rubber (phr); providing the inventive carbon black of claim in an amount ranging from 2 parts per hundred rubber (phr) to 25 parts per hundred rubber (phr); and mixing the elastomer and the carbon black to form an elastomeric composition.

BRIEF DESCRIPTION OF THE DRAWINGS

The foregoing summary, as well as the following description of the disclosure, is better understood when read in conjunction with the appended drawings. For the purpose of illustrating the disclosure, the drawings illustrate some, but not all, alternative embodiments. This disclosure is not limited to the precise arrangements and instrumentalities shown. The following figures, which are incorporated into and constitute part of the specification, assist in explaining the principles of the disclosure.

FIG. 5A is a representative plot showing the volume resistivity of the carbon black materials as a function of phr.

Figure 1A:
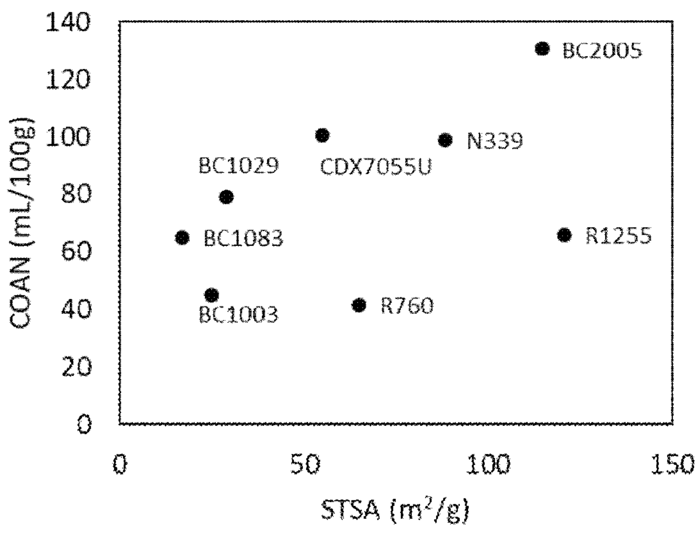
FIG. 1A is a representative plot of the compressed oil absorption numbers (COAN) as determined by ASTM D3493 as a function of the statistical thickness surface area (STSA) as determined by ASTM D6556 for the carbon black materials.
Figure 1B:
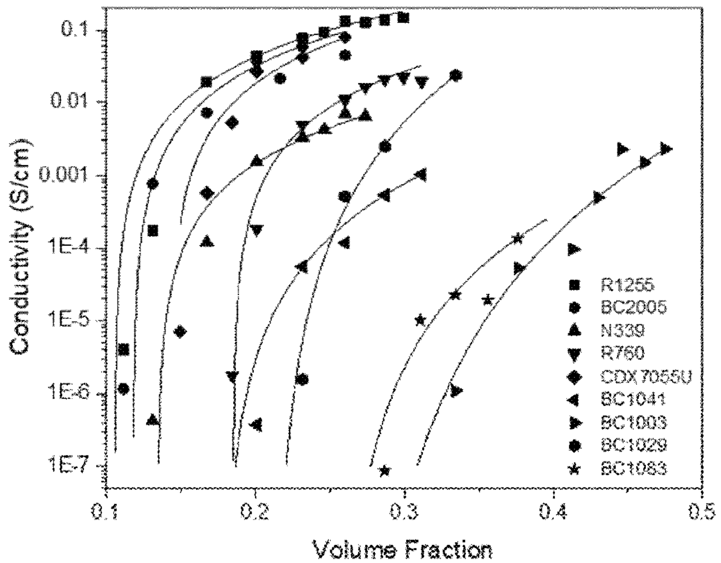
FIG. 1B is a representative plot of the conductivity as a function of volume fraction for the carbon black materials.
Figure 2A:
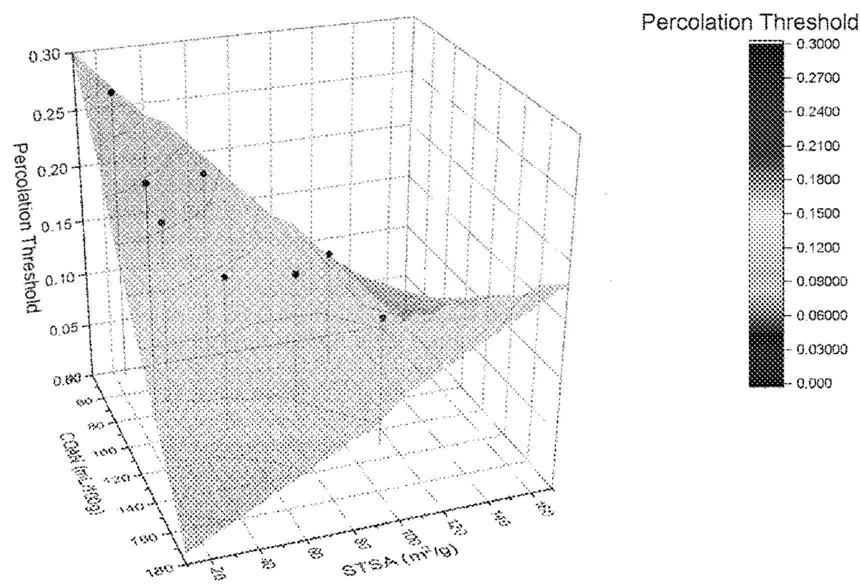
FIG. 2A is a representative view of a 3D plot of the percolation study results for the carbon black materials.
Figure 2B:
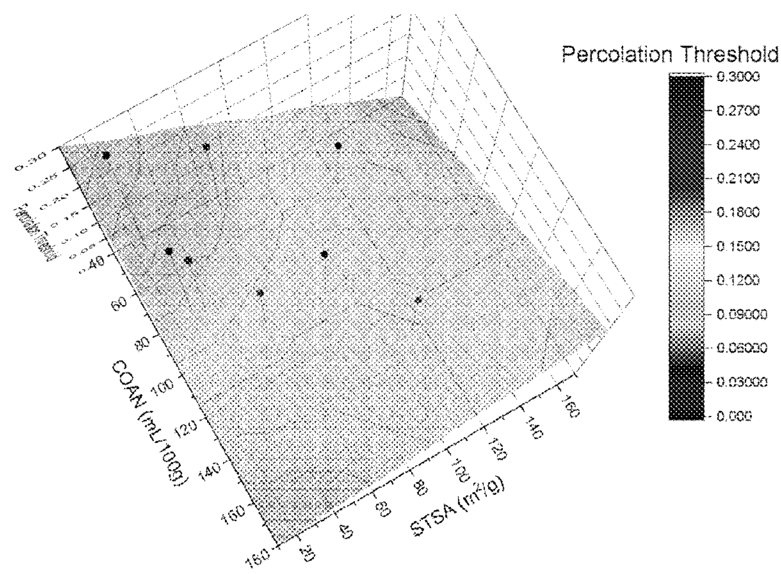
FIG. 2B is an alternate representative view of a 3D plot of the percolation study results for the carbon black materials.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the invention as claimed.

DETAILED DESCRIPTION

The present disclosure can be understood more readily by reference to the following detailed description of the invention and the Examples included therein.

Before the present carbon blacks, compositions, articles, and methods are disclosed and described, it is to be understood that they are not limited to specific synthetic methods unless otherwise specified, or to particular reagents unless otherwise specified, as such can, of course, vary. It is also to be understood that the terminology used is for the purpose of describing particular aspects only and is not intended to be limiting. Although any methods and materials similar or equivalent to those described can be used in the practice or testing of the present disclosure, example methods and materials are now described.

All publications are incorporated herein by reference to disclose and describe the methods and/or materials in connection with which the publications are cited.

A. Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

Unless specifically stated to the contrary, the singular forms "a," "an" and "the" include plural referents unless the context clearly dictates otherwise. Thus, for example, reference to "a carbon black" or "an elastomer" includes mixtures of two or more carbon blacks, or elastomers, respectively.

Ranges can be expressed as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed, and that each value is also disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

When the term "about" precedes a numerical value, the numerical value can vary within ±10% unless specified otherwise.

The terms "optional" or "optionally" means that the subsequently described event or circumstance can or can not occur, and that the description includes instances where said event or circumstance occurs and instances where it does not.

"Nitrogen surface area (NSA)" and "statistical thickness surface area (STSA)" refers to nitrogen surface area and statistical thickness surface area as measured according to ASTM Test Method D6556, which is incorporated by reference.

"Iodine absorption number" refers to iodine absorption values as measured according to ASTM D1510.

"Oil absorption number (OAN)" refers to oil absorption values as measured according to ASTM D2414.

"Compressed oil absorption number (COAN)" refers to compressed oil absorption values as measured according to ASTM D3493.

"325 mesh water wash residue" refers to residue values as measured according to ASTM D1514.

"Transmission value at 425 nm" refers to transmission values measured according to ASTM D1618.

"Heat loss" refers to heat loss values measured according to ASTM D1514.

All the above-described ASTM methods are incorporated by reference in their entireties.

Unless specifically described otherwise, "phr" is intended to refer to parts per hundred of rubber, as commonly understood and used in the rubber industry.

Disclosed are the components to be used to prepare the compositions of the disclosure as well as the compositions themselves to be used within the methods disclosed. These and other materials are disclosed, and it is understood that when combinations, subsets, interactions, groups, etc. of these materials are disclosed that while specific reference of each various individual and collective combinations and permutation of these compounds can not be explicitly disclosed, each is specifically contemplated and described. For example, if a particular carbon black is disclosed and discussed and a number of modifications that can be made to a number of materials including the carbon blacks are discussed, specifically contemplated is each and every combination and permutation of the carbon black and the modifications that are possible unless specifically indicated to the contrary. Thus, if a class of carbon blacks A, B, and C are disclosed as well as a class of carbon blacks D, E, and F and an example of a combination carbon black, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions. Thus, if there are a variety of additional steps that can be performed it is understood that each of these additional steps can be performed with any specific embodiment or combination of embodiments of the methods.

Each of the materials disclosed are either commercially available and/or the methods for the production thereof are known to those of skill in the art.

It is understood that the compositions disclosed have certain functions. Disclosed are certain structural requirements for performing the disclosed functions, and it is understood that there are a variety of structures that can perform the same function that are related to the disclosed structures, and that these structures will typically achieve the same result.

B. Carbon Blacks

Figure 3A:
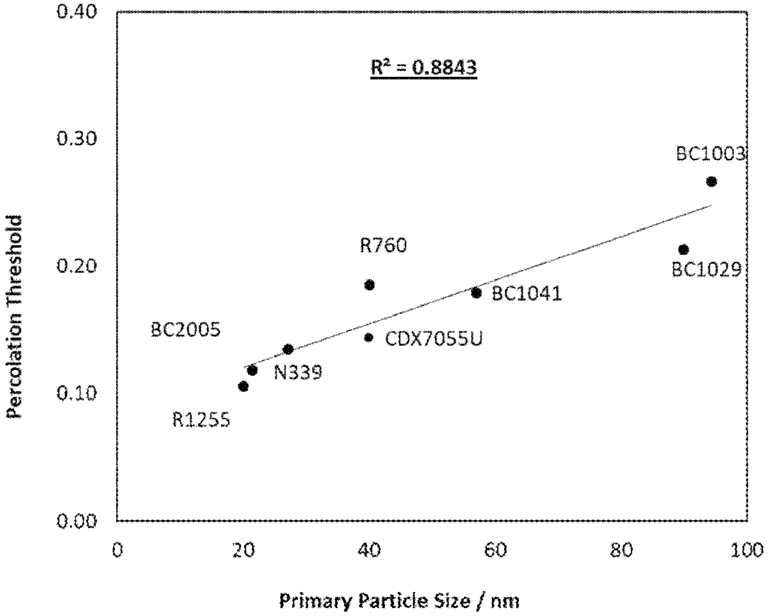
FIG. 3A is a representative plot showing the regression analysis of the percolation threshold as a function of primary particle size (or STSA for non-porous grades) for the carbon black materials. $R^2$=0.8843.
Figure 3B:
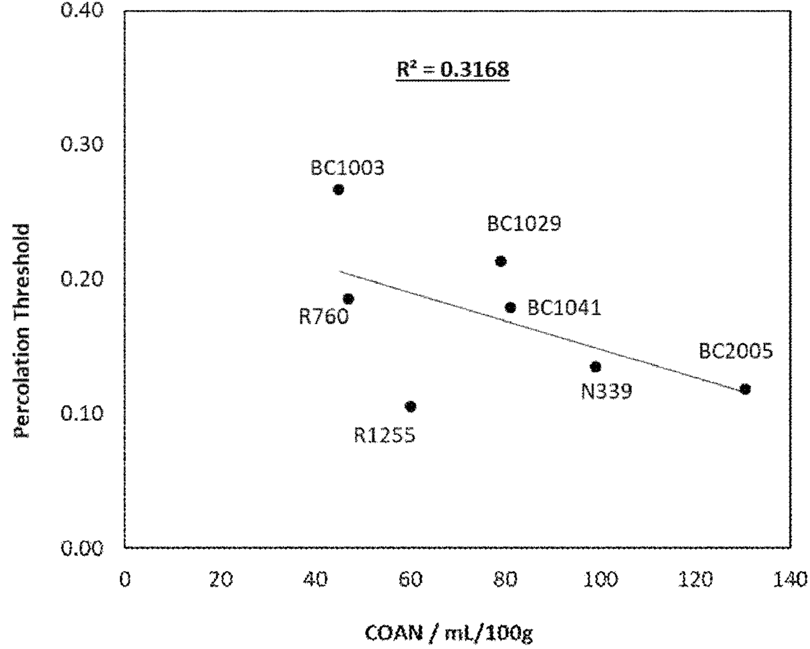
FIG. 3B is a representative plot showing the regression analysis of the percolation threshold as a function of crushed oil absorption number (COAN) for the carbon black materials. $R^2$=0.3168.
Figure 4:
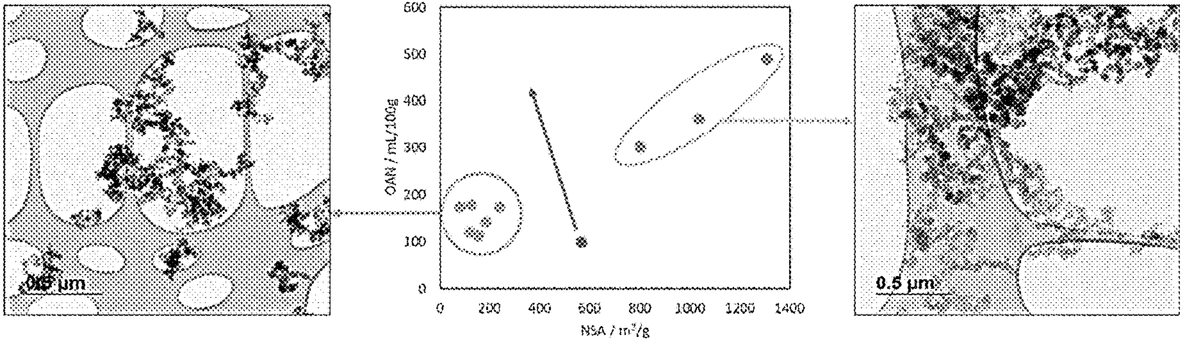
FIG. 4 is shows representative data showing the correlation between OAN as a function of NSA for the carbon black materials and the morphology as measured by transmission electron microscopy (TEM).
Figure 6:
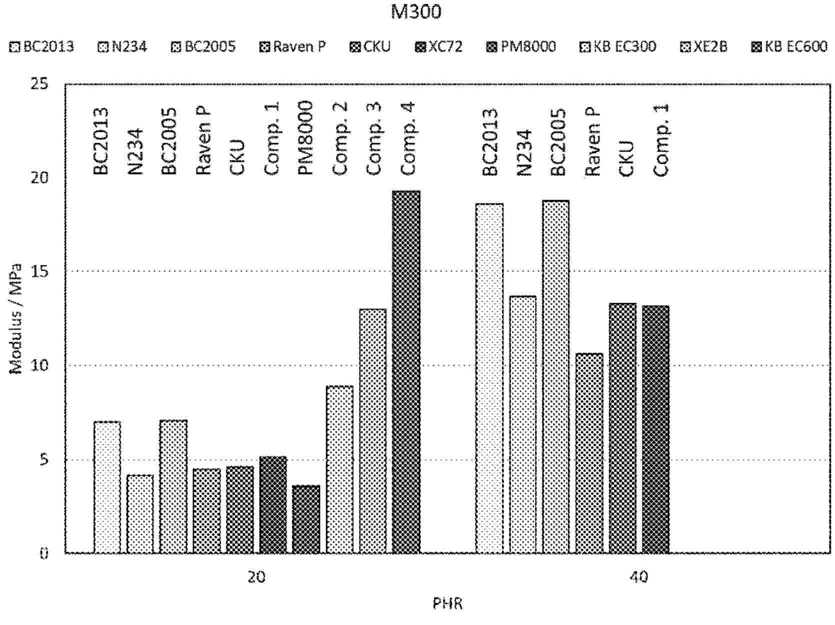
FIG. 6 is a representative bar graph showing the modulus values of the carbon black materials. The carbon black materials are classified into two groups: 20 phr "extraconductive" carbon black and 40 phr traditional grades.
Figure 7:
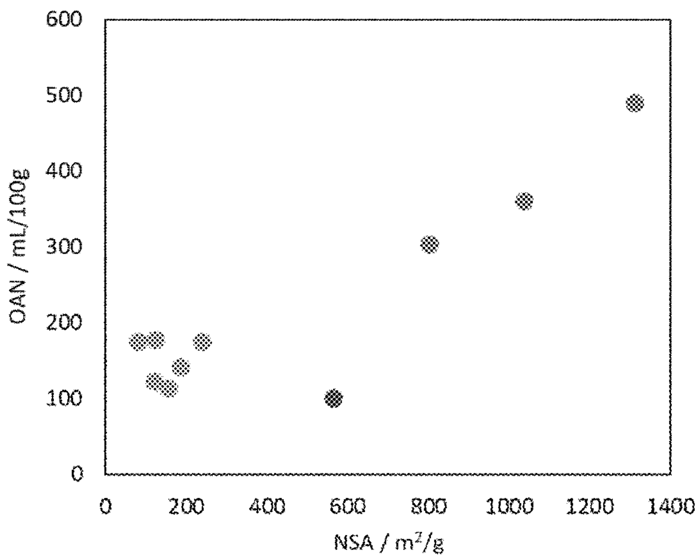
FIG. 7 is a representative scatterplot showing oil absorption numbers (OAN) as a function of nitrogen surface area (NSA) for the carbon black materials.
Figure 8:
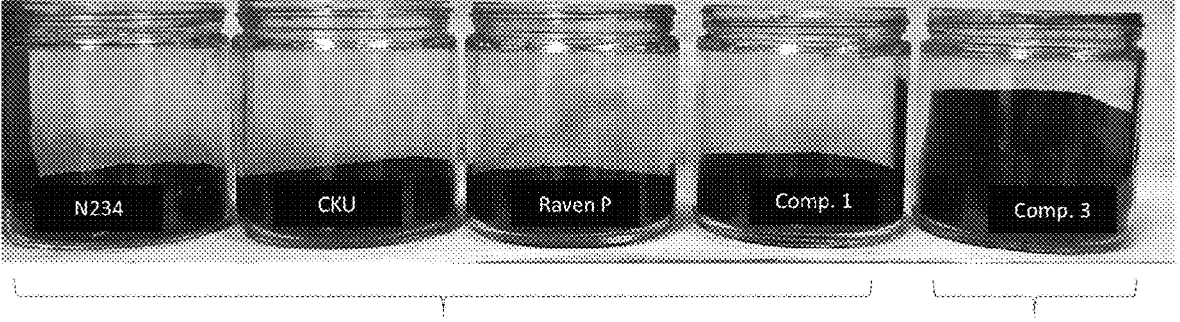
FIG. 8 is a representative photograph of the carbon black material samples at equal masses for oil absorption number (OAN) measurements. Shown are conductive carbon black samples N234, CKU, Raven P, and Comp. 1, as well as "extraconductive" Comp. 3.
Figure 9:
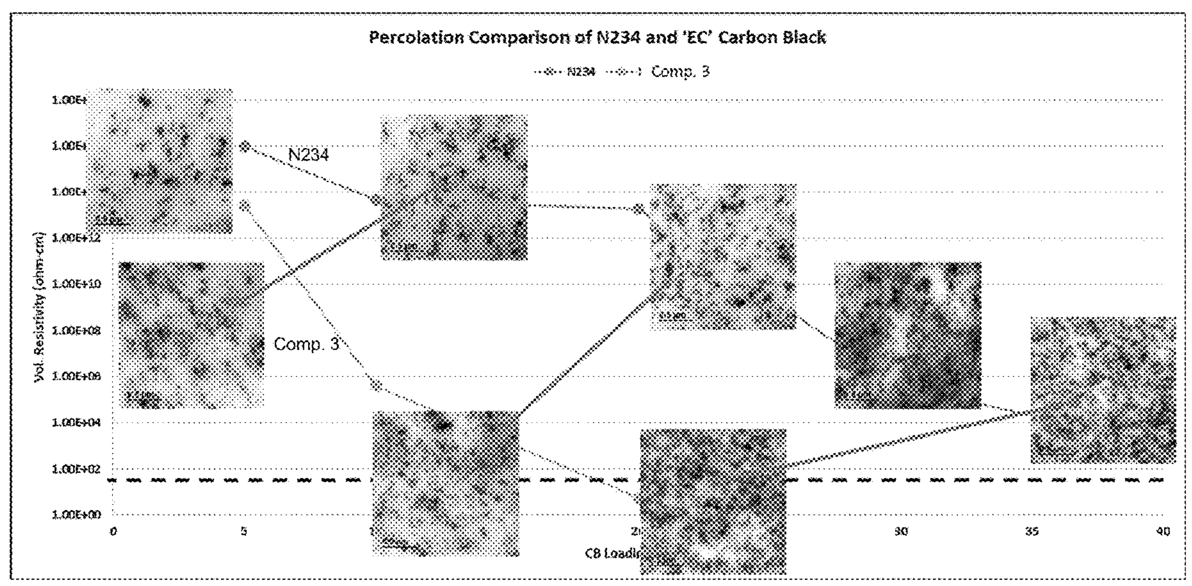
FIG. 9 shows representative data obtained from both percolation studies and transmission electron microscopy (TEM) of N234 and Comp. 3 carbon black materials. The images correspond to the TEM taken of the material at the given loading along the percolation curves.
Figure 10A:
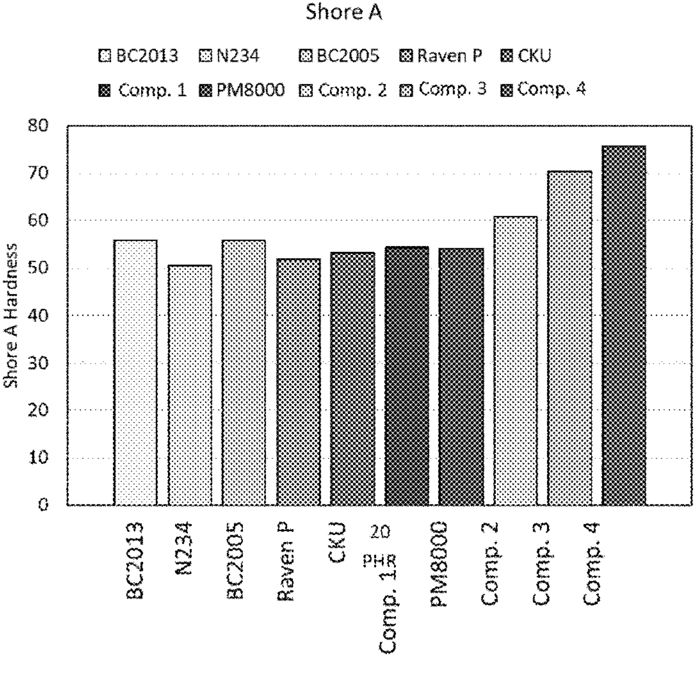
FIG. 10A is a bar graph showing representative data for Shore A hardness values for the carbon black materials.
Figure 10B:
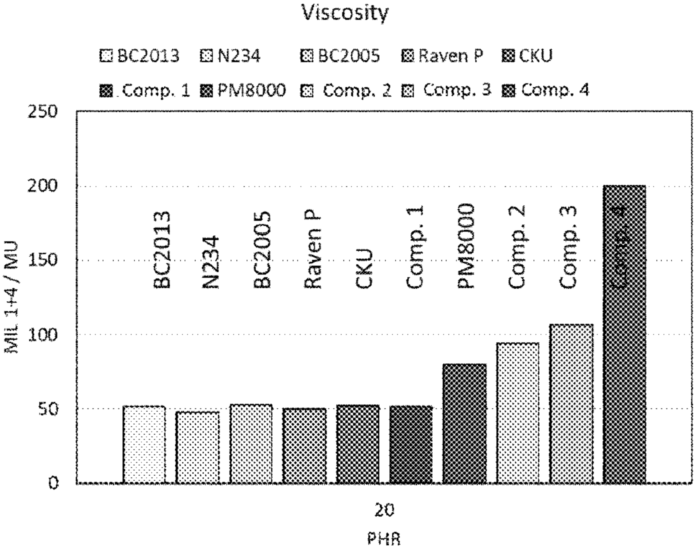
FIG. 10B is a bar graph showing representative data for viscosity values for the carbon black materials.
Figure 11:
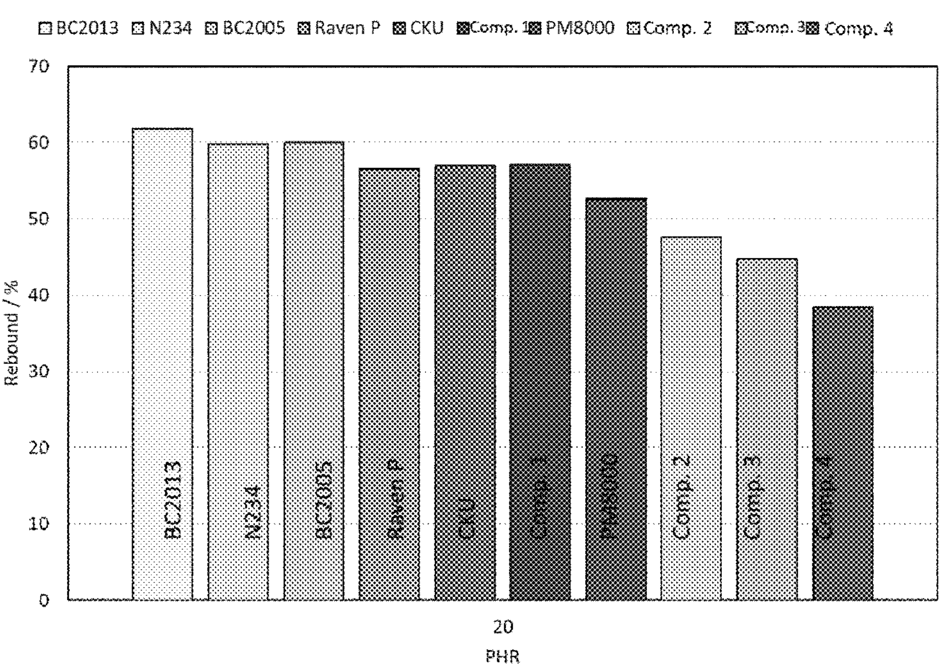
FIG. 11 is a bar graph showing representative data for the rebound performance of the carbon black materials.
Figure 12:
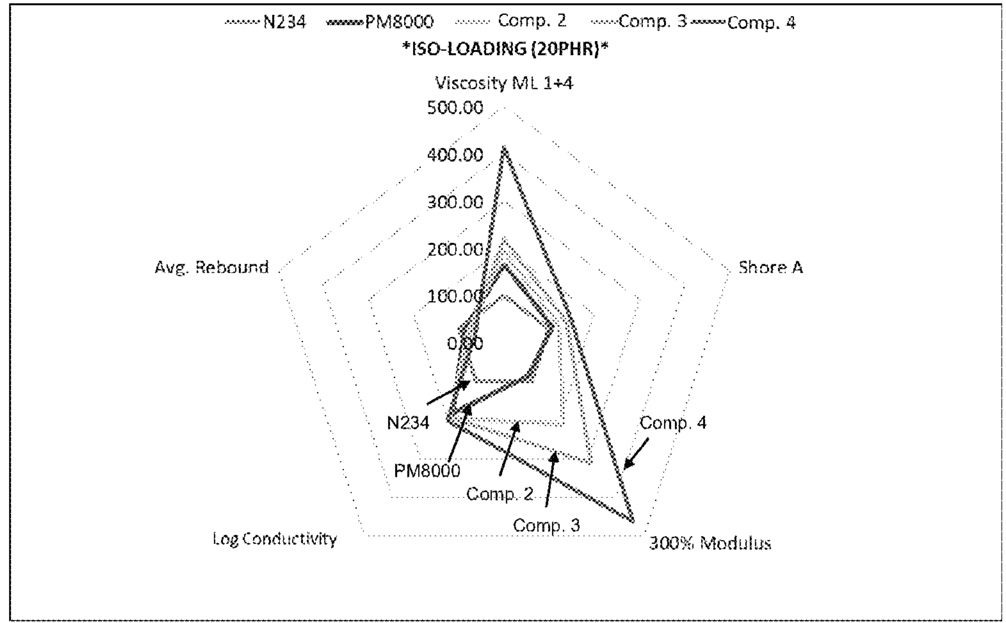
FIG. 12 is a representative radar chart showing multivariable data for the carbon black materials and the measurement tests performed: viscosity, average rebound, shore A hardness, conductivity (log conductivity), and modulus (300% modulus).

As shown in FIGS. 1A-2B, according to a percolation study for various carbon blacks, it was unexpectedly determined that surface area and structure can in some aspects be impactful for larger primary particle size carbon blacks, but at smaller primary particle sizes, structure can become less important. In addition, with reference to FIGS. 3A-3B, regression and statistical analysis shows that primary particle size (or STSA for non-porous grade carbon blacks) can be a predictive model for controlling conductivity of a elastomeric composition comprising carbon blacks. As shown in FIG. 3B, the same was not observed for compressed oil absorption number values (COAN). FIG. 4 shows NSA versus OAN values for conductive carbon blacks (shown to the left), extra-conductive carbon blacks (shown to the right), and in the middle of the NSA graph, an exemplary carbon black which has markedly improved electrical conductivity approaching that of extra-conductive carbon blacks.

The inventive carbon blacks can in some aspects be defined by various properties. In one aspect, the carbon black has the following properties: an oil absorption number (OAN) ranging from about 74 cc/100 g to about 114 cc/100 g; a nitrogen surface area (NSA) ranging from about 450 $m^2/g$ to about 650 $m^2/g$; a statistical thickness surface area (STSA) ranging from about 330 $m^2/g$ to about 385 $m^2/g$; a transmission value at 425 nm ranging from about 95% to about 100%; a heat loss ranging from 0 to about 12.5%; and a 325 mesh water wash residue ranging from 0 to about 40 ppm.

In one aspect, exemplary embodiments of the inventive carbon black can have an oil absorption number (OAN) ranging from about 89 cc/100 g to about 109 cc/100 g. In a further aspect, exemplary embodiments of the inventive carbon black can have an oil absorption number (OAN) ranging from about 94 cc/100 g to about 104 cc/100 g. In another aspect, the inventive carbon black can have an oil absorption number (OAN) of about 96 cc/100 g.

In a further aspect, exemplary embodiments of the inventive carbon black can have a nitrogen surface area (NSA) ranging from about 520 $m^2/g$ to about 550 $m^2/g$. In a further aspect, exemplary embodiments of the inventive carbon black can have a nitrogen surface area (NSA) ranging from about 525 $m^2/g$ to about 545 $m^2/g$. In another aspect, the inventive carbon black can have a nitrogen surface area (NSA) of about 535 $m^2/g$. In still another aspect, the inventive carbon black can have a nitrogen surface area (NSA) of about 570 $m^2/g$. In a further aspect, the inventive carbon black can have a nitrogen surface area (NSA) of about 605 $m^2/g$.

In some aspects, exemplary embodiments of the inventive carbon black can have a statistical thickness surface area (STSA) ranging from about 360 $m^2/g$ to about 380 $m^2/g$. In a further aspect, exemplary embodiments of the inventive carbon black can have a statistical thickness surface area (STSA) ranging from about 365 $m^2/g$ to about 375 $m^2/g$. In a further aspect, exemplary embodiments of the inventive carbon black can have a statistical thickness surface area (STSA) ranging from about 367 $m^2/g$ to about 373 $m^2/g$. In one specific aspect, exemplary embodiments of the inventive carbon black can have a statistical thickness surface area (STSA) of about 370 $m^2/g$. In another aspect, exemplary embodiments of the inventive carbon black can have a statistical thickness surface area (STSA) of about 350 $m^2/g$.

In further aspects, exemplary embodiments of the inventive carbon black can have a transmission value at 425 nm ranging from about 96% to about 100%. In another aspect, exemplary embodiments of the inventive carbon black can have a transmission value at 425 nm ranging from about 97% to about 100%. In another aspect, exemplary embodiments of the inventive carbon black can have a transmission value at 425 nm ranging from about 98% to about 100%.

In some aspects, exemplary embodiments of the inventive carbon black can have a heat loss ranging from 0 to about 10%. In a further aspect, exemplary embodiments of the inventive carbon black can have a heat loss ranging from 0 to about 8%. In another aspect, exemplary embodiments of the inventive carbon black can have a heat loss ranging from 0 to about 5%.

In further aspects, exemplary embodiments of the inventive carbon black can have a 325 mesh water wash residue ranging from 0 to about 35 ppm. In another aspect, exemplary embodiments of the inventive carbon black can have a 325 mesh water wash residue ranging 0 to about 30 ppm. In another aspect, exemplary embodiments of the inventive carbon black can have a 325 mesh water wash residue ranging from 0 to about 25 ppm. In a further aspect, exemplary embodiments of the inventive carbon black can have a 325 mesh water wash residue ranging from 0 to about 20 ppm. In a still further aspect, exemplary embodiments of the inventive carbon black can have a 325 mesh water wash residue ranging from 0 to about 15 ppm. In another aspect, exemplary embodiments of the inventive carbon black can have a 325 mesh water wash residue ranging from 0 to about 10 ppm.

In some aspects, embodiments of the carbon blacks have low volatile content. In one aspect, exemplary embodiments of the inventive carbon black can have a volatile content of less than about 5%. In a further aspect, exemplary embodiments of the inventive carbon black can have a volatile content of less than about 3.5%. In a still further aspect, exemplary embodiments of the inventive carbon black can have a volatile content ranging from about 1% to about 3.5%.

In various aspects, exemplary embodiments of the inventive carbon black can have a primary particle size distribution ranging from about 5 nm to about 25 nm. In one aspect, exemplary embodiments of the inventive carbon black can have a primary particle size distribution ranging from about 5 nm to about 20 nm. In another aspect, exemplary embodiments of the inventive carbon black can have a primary particle size distribution ranging from about 5 nm to about 15 nm. In another aspect, exemplary embodiments of the inventive carbon black can have a primary particle size distribution ranging from about 4 nm to about 10 nm. In another aspect, exemplary embodiments of the inventive carbon black can have a primary particle size distribution ranging from about 5 nm to about 9 nm. In a further aspect, exemplary embodiments of the inventive carbon black can have a primary particle size distribution ranging from about 6 nm to about 8 nm. In one specific aspect, exemplary embodiments of the inventive carbon black can have a primary particle size distribution of about 8 nm.

C. Elastomeric Compositions

Another aspect of this disclosure relates to elastomeric (e.g., rubber) compositions comprising the inventive carbon blacks. In general the rubber compositions can comprise at least one elastomer and any inventive carbon black as described above.

According to one aspect, the inventive elastomeric composition comprises an elastomer in an amount of 100 parts per hundred rubber (phr); and the inventive carbon black in an amount ranging from 2 parts per hundred rubber (phr) to 25 parts per hundred rubber (phr). In one aspect, the elastomer comprises natural rubber (NR), polybutadiene rubber (BR), styrene butadiene rubber (SBR), synthetic polyisoprene rubber, butyl rubber, ethylene propylene rubber, or any blend or combination thereof. In a further aspect, the elastomer comprises natural rubber (NR), polybutadiene rubber (BR), or any blend or combination thereof.

In general, the elastomeric compositions can be made according to methods known in the art. In one aspect, the method of preparing the elastomeric composition comprises providing an elastomer in an amount of about 100 parts per hundred rubber (phr); providing the carbon black in an amount ranging from 2 parts per hundred rubber (phr) to 25 parts per hundred rubber (phr); and mixing the elastomer and the carbon black to form an elastomeric composition. Also disclosed are articles comprising any inventive elastomeric composition.

It is further understood that any types of mixing can be utilized to prepare the inventive elastomeric composition. In certain aspects, the step of mixing comprises a reactive mixing. In yet other aspects, the step of mixing comprises a conventional step of mixing of ingredients. In still further aspects, the step of mixing comprises blending. In certain aspects, the step of mixing results in homogeneous compositions.

D. Examples

The following examples further illustrate this disclosure. The scope of the disclosure and claims is not limited by the scope of the following examples.

Figure 5:
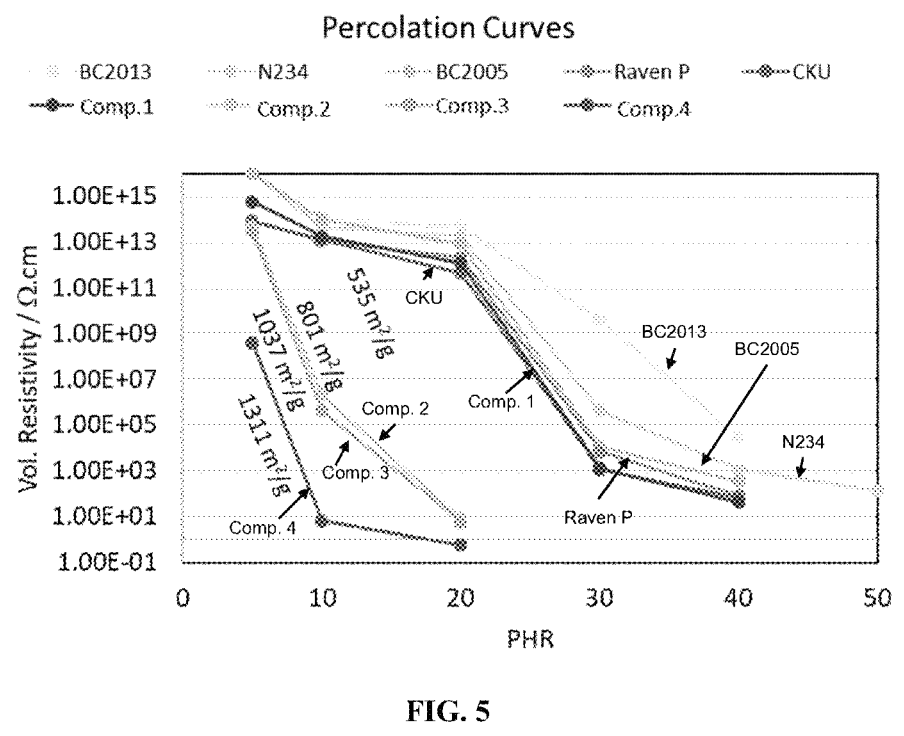

With reference to FIG. 4 and FIG. 5, and as shown in Table 1 below, the inventive carbon black (referred to as "PM8000") has higher NSA values at similar OAN values, relative to conductive carbon blacks, which allows the inventive carbon blacks to exhibit performance that approaches that exhibited by extra-conductive carbon blacks.

Table 1

| | | NSA ($m^2$/g) | OAN (mL/100 g) | Particle Size (nm) |
|---|---|---|---|---|
| Conductive Blacks | BC2013 | 119 | 122 | 32 |
| | N234 | 119 | 122 | 20 |
| | BC2005 | 122 | 175 | 20 |
| | Raven P | 155 | 114 | 24 |
| | Conductex KU | 185 | 142 | 18 |
| Comp. Conductive | Comp. 1 | 238 | 175 | 21 |
| | PM8000 | 535 | 99 | 7 |
| Comp. Extraconductive | Comp 2. | 801 | 302 | 25 |
| | Comp 3. | 1037 | 361 | 30 |
| 'EC' Carbon Blacks | Comp. 4 | 1311 | 490 | 21 |

As shown in Table 2, the inventive carbon blacks can have much lower envelope densities relative to standard carbon blacks.

TABLE 2

| | | OAN (mL/100 g) | V'/V | Envelope Density (g/mL) |
|---|---|---|---|---|
| Conductive Blacks | BC2013 | 175 | 3.4 | 1.9 |
| | N234 | 122 | 2.7 | 2.2 |
| | BC2005 | 175 | 4.0 | 2.3 |
| | Raven P | 144 | 2.2 | 1.9 |
| | Conductex KU | 142 | 2.8 | 1.9 |
| Comp. Conductive | Comp. 1 | 175 | 4.0 | 2.3 |
| Comp. Extraconductive | Comp 2. | 302 | 3.9 | 1.3 |
| | Comp 3. | 361 | 3.7 | 1.0 |
| 'EC' Carbon Blacks | Comp. 4 | 490 | 4.5 | 0.92 |

Table 3 demonstrates that the inventive carbon blacks have a nearly identical area fraction and NND despite N234 being loaded being loaded at double the phr of the electrically conductive carbon black.

TABLE 3

| | Area fraction | Nearest Neighbor Distance (nm) |
|---|---|---|
| N234 40 phr | 28.2% | 15.1 |
| 'EC' Comp. 3 20 phr | 32.6% | 15.4 |

The volatile content of the inventive carbon blacks is also low, as shown in Table 4. Volatile content is generally a measure of evolved oxygen containing functional groups. This can be an important property because in some aspects, the inventive carbon blacks can be provided in an untreated (i.e., un-ozonated) state relative to existing products commonly used to applications such as automotive top coats. Specifically, by preparing the carbon black up to the point where other products are ozonated, and beading the carbon black, good electrical conductivity in rubber can be observed.

TABLE 4

| Sample | Volatile Content (%) |
|---|---|
| 1 | 2.3 |
| 2 | 2.8 |
| 3 | 2.5 |
| 4 | 2.8 |
| 5 | 2.5 |
| 6 | 1.3 |
| 7 | 1.5 |
| 8 | 2.2 |
| 9 | 3.3 |
| 10 | 3.2 |
| 11 | 2.9 |
| 11-Run 2 | 2.0 |

Features and advantages of this disclosure are apparent from the detailed specification, and the claims cover all such features and advantages. Numerous variations will occur to those skilled in the art, and any variations equivalent to those described in this disclosure fall within the scope of this disclosure. Those skilled in the art will appreciate that the conception upon which this disclosure is based may be used as a basis for designing other methods and systems for carrying out the several purposes of this disclosure. As a result, the claims should not be considered as limited by the description or examples.

What is claimed is:

1. A carbon black having the following properties:

a) an oil absorption number (OAN) ranging from 89 cc/100g to 109 cc/100g;

b) a nitrogen surface area (NSA) ranging from 450 $m^2$/g to 650 $m^2$/g;

c) a statistical thickness surface area (STSA) ranging from 330 $m^2$/g to 385 $m^2$/g;

d) a transmission value at 425 nm ranging from 95% to 100%;

e) a heat loss ranging from 0 to 12.5%;

f) a 325 mesh water wash residue ranging from 0 to 40 ppm;

g) a volatile content of less than 5%; and h) a primary particle size distribution ranging from 5 nm to 15 nm.

2. The carbon black of claim 1, having an oil absorption number (OAN) ranging from 94 cc/100 g to 104 cc/100 g.

3. The carbon black of claim 1, having a transmission value at 425 nm ranging from 96% to 100%.

4. The carbon black of claim 1, having a heat loss ranging from 0 to 10%.

5. The carbon black of claim 1, having a 325 mesh water wash residue ranging from 0 to 35 ppm.

6. The carbon black of claim 1, having a 325 mesh water wash residue ranging from 0 to 30 ppm.

7. The carbon black of claim 1, having a 325 mesh water wash residue ranging from 0 to 25 ppm.

8. An elastomeric composition comprising:

a) an elastomer in an amount of 100 parts per hundred rubber (phr); and b) the carbon black of claim 1 in an amount ranging from 2 parts per hundred rubber (phr) to 25 parts per hundred rubber (phr).

9. The elastomeric composition of claim 8, wherein the elastomer comprises natural rubber (NR), polybutadiene rubber (BR), styrene butadiene rubber (SBR), synthetic polyisoprene rubber, butyl rubber, ethylene propylene rubber, or any blend or combination thereof.

10. The elastomeric composition of claim 8, wherein the elastomer comprises natural rubber (NR), polybutadiene rubber (BR), or any blend or combination thereof.

11. A method comprising:

a) providing an elastomer in an amount of about 100 parts per hundred rubber (phr);

b) providing the carbon black of claim 1 in an amount ranging from 2 parts per hundred rubber (phr) to 25 parts per hundred rubber (phr); and mixing the elastomer and the carbon black to form an elastomeric composition.

* * * * *